(12) United States Patent
Yamamoto et al.

(10) Patent No.: US 10,502,417 B2
(45) Date of Patent: Dec. 10, 2019

(54) EXHAUST GAS TREATMENT METHOD AND EXHAUST GAS TREATMENT DEVICE

(71) Applicant: TAIYO NIPPON SANSO CORPORATION, Tokyo (JP)

(72) Inventors: Yasuyuki Yamamoto, Kofu (JP); Kimio Iino, Tokyo (JP); Yoshiyuki Hagihara, Kofu (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 165 days.

(21) Appl. No.: 15/541,757

(22) PCT Filed: Sep. 10, 2015

(86) PCT No.: PCT/JP2015/075754
§ 371 (c)(1),
(2) Date: Jul. 6, 2017

(87) PCT Pub. No.: WO2016/117167
PCT Pub. Date: Jul. 28, 2016

(65) Prior Publication Data
US 2017/0370580 A1  Dec. 28, 2017

(30) Foreign Application Priority Data
Jan. 21, 2015  (JP) ................. 2015-009572

(51) Int. Cl.
*F23G 7/06* (2006.01)
*F23G 5/16* (2006.01)
(Continued)

(52) U.S. Cl.
CPC ............. *F23G 7/06* (2013.01); *D01F 9/32* (2013.01); *F23G 5/16* (2013.01); *F23G 5/46* (2013.01);
(Continued)

(58) Field of Classification Search
CPC .................................. F23G 7/06; F23G 5/16
(Continued)

(56) References Cited

U.S. PATENT DOCUMENTS 4,154,567 A   5/1979   Dahmen
4,519,993 A   5/1985   McGill et al.
(Continued)

FOREIGN PATENT DOCUMENTS

CN   101809254 A   8/2010
GB   2 116 531     9/1983
(Continued)

OTHER PUBLICATIONS

Jasanese Notice of Allowance issued in Appln. No. 2015-009572 dated Feb. 13, 2018 (w/ transl.).
(Continued)

*Primary Examiner* — Avinash A Savani
*Assistant Examiner* — Aaron H Heyamoto
(74) *Attorney, Agent, or Firm* — Nixon & Vanderhye P.C.

(57) ABSTRACT

The present invention provides an exhaust gas treatment method and an exhaust gas treatment device which prevent the generation of $NO_X$, and treat a first exhaust gas and a second exhaust gas with a small amount of fuel, and the exhaust gas treatment method comprises a first combustion step which treats a first exhaust gas discharged from a carbonization furnace for carbonizing a fibrous substance in an inert atmosphere and a graphitization furnace for graphitizing a fibrous substance in an inert atmosphere and a second combustion step of treating a second exhaust gas discharged from a flameproofing furnace for flameproofing a fibrous substance in air atmosphere, wherein the first exhaust gas is combusted at an oxygen ratio of 0.8 or less in the first combustion step, and the second exhaust gas is combusted in the second combustion step using sensible (Continued)

heat and latent heat of a third exhaust gas discharged in the first combustion step.

22 Claims, 3 Drawing Sheets

(51) Int. Cl.
    *F23G 5/46*     (2006.01)
    *F23L 7/00*     (2006.01)
    *D01F 9/32*     (2006.01)

(52) U.S. Cl.
    CPC .............. *F23G 7/065* (2013.01); *F23L 7/007* (2013.01); *D01F 9/328* (2013.01); *F23G 2202/101* (2013.01); *F23G 2202/102* (2013.01); *F23G 2202/103* (2013.01); *F23G 2209/14* (2013.01)

(58) Field of Classification Search
    USPC .......................................................... 431/5
    See application file for complete search history.

(56) References Cited

U.S. PATENT DOCUMENTS

| | | |
|---|---|---|
| 7,273,366 B1 | 9/2007 | Sujata |
| 2003/0108831 A1 | 6/2003 | Harada et al. |

FOREIGN PATENT DOCUMENTS

| | | | | |
|---|---|---|---|---|
| GB | 2116531 A | * | 9/1983 | ............. B01D 53/58 |
| JP | 53-85975 | | 7/1978 | |
| JP | 58-164922 | | 9/1983 | |
| JP | 6-184831 | | 7/1994 | |
| JP | 2000-111025 | | 4/2000 | |
| JP | 2001-324119 | | 11/2001 | |
| JP | 2001-355820 | | 12/2001 | |
| JP | 2003-113538 | | 4/2003 | |
| JP | 2003-130326 | | 5/2003 | |
| JP | 3106971 | | 1/2005 | |
| JP | 2007-93156 | | 4/2007 | |
| JP | 2009-174077 | | 8/2009 | |
| JP | 2011-21779 | | 2/2011 | |
| JP | 2012-67419 | | 4/2012 | |
| JP | 2012-67977 | | 4/2012 | |
| JP | 2013-32608 | | 2/2013 | |
| JP | 2013032608 A | * | 2/2013 | |
| JP | 2014-528052 | | 10/2014 | |
| TW | I336269 | | 1/2011 | |
| WO | WO 2013/036124 | | 3/2013 | |

OTHER PUBLICATIONS

International Search Report for PCT/JP2015/075754 dated Dec. 22, 2015, 4 pages.

Search Report issued in EP Appln. No. 15878856.2 dated Jul. 25, 2018.

Notification of the First Office Action dated Aug. 20, 2018 issued in Chinese Application No. 201580070682.6 with Engish translation (14 pages).

Office Action issued in TW Appln. No. 104130775 dated Aug. 5, 2019 (w/ partial translation).

* cited by examiner

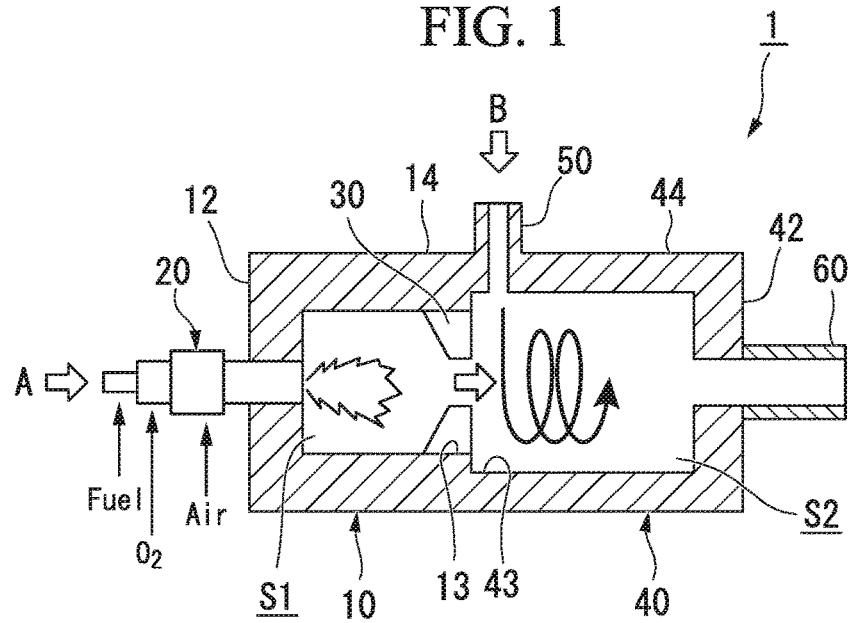
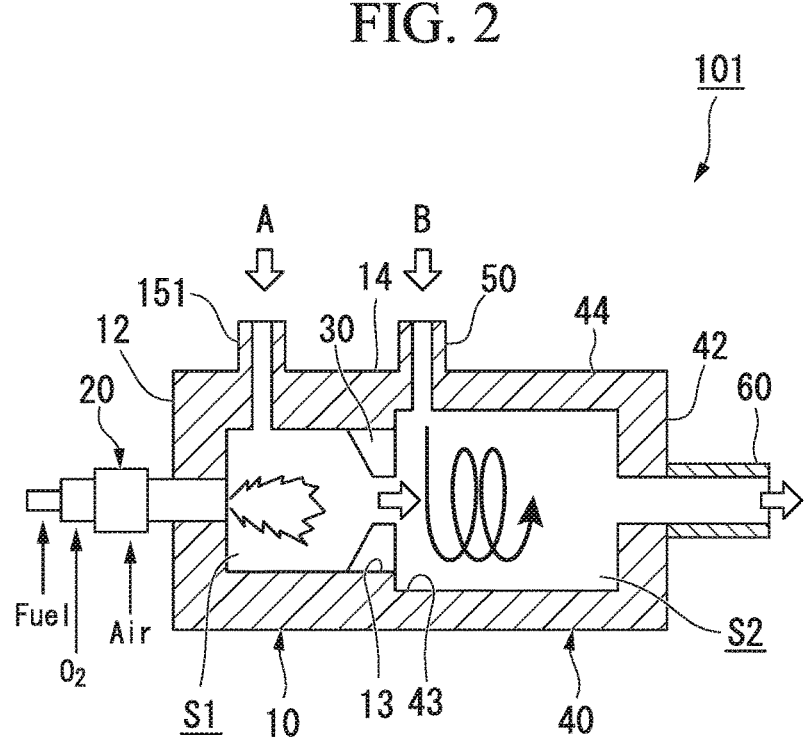

EXHAUST GAS TREATMENT METHOD AND EXHAUST GAS TREATMENT DEVICE

This application is the U.S. national phase of international Application No. PCT/JP2015/075754 filed Sep. 10, 2015, which designated the U.S. and claims priority to Japanese Patent Application No. 2015-009572, filed Jan. 21, 2015, the entire contents of each of which are hereby incorporated herein by reference.

TECHNICAL FIELD OF THE INVENTION

The present invention relates to an exhaust gas treatment method and an exhaust gas treatment device.

Priority is claimed on Japanese Patent Application No. 2015-009572, filed Jan. 21, 2015, the content of which is incorporated herein by reference.

RELATED ART

Carbon fibers have been used as a reinforcement for various materials because they have superior specific strength, specific modulus, heat resistance, chemical resistance, and so on. In general, when carbon fibers are produced, the production method includes a plurality of steps in order to obtain desired properties. For example, when acrylic fiber is used as a precursor of carbon fibers, flameproofing fiber is produced by pre-oxidizing in the air at 200 to 300° C. in a first step (flameproofing step). Then, carbon fibers are produced by carbonizing at 300 to 2,000° C. in an inert atmosphere (carbonizing step). In addition, when carbon fibers having a high elastic modulus are produced, the carbon fibers obtained in the carbonizing step is graphitized at 2,000 to 3,000° C. in an inert atmosphere (graphitizing step).

However, during the flameproofing step, the carbonizing step, and the graphitizing step, an exhaust gas is generated. Specifically, since the carbonizing step, and the graphitizing step are carried out in an inert atmosphere, gas containing hydrogen cyanide, ammonia, carbon monoxide, carbon dioxide, methane, tar, etc. which are decomposed components of the flameproofing fiber, and the inert gas, such as nitrogen, as a base component (below, exhaust gas generated in the carbonizing step and the graphitizing step is denoted by "first exhaust gas") is generated (Patent Document No. 3).

Similarly, since the flameproofing step is carried out in the air, gas containing hydrogen cyanide, ammonia, carbon monoxide, carbon dioxide, methane, tar, and so on which are decomposed components of the acrylic fiber, and oxygen, nitrogen, and argon, as base components (below, exhaust gas generated in the flameproofing step is denoted by "second exhaust gas") is generated (Patent Documents Nos. 2 and 4).

As explained above, the exhaust gas which is generated in the flameproofing step, the carbonizing step, and the graphitizing step contains strong harmful gas, such as hydrogen cyanide, ammonia, and so on. Accordingly, an exhaust gas treatment method for detoxifying the exhaust gas generated in these steps is required.

As a conventional exhaust gas treatment method, a method in which the first and second exhaust gases are blown into one treatment furnace (combustion chamber), and decomposed by air combustion has been well-known (For example, Patent Document No. 1). As another conventional exhaust gas treatment method, a method in which the first and second exhaust gases are decomposed by air combustion in a separate treatment furnace, respectively has been well-known (For example, Patent Document No. 2).

PRIOR ART DOCUMENTS

Patent Documents

[Patent Document 1] Japanese Unexamined Patent Application, First Publication No. 2011-021779
[Patent Document 2] Japanese Unexamined Patent Application, First Publication No. 2001-324119
[Patent Document 3] Japanese Unexamined Patent Application, First Publication No.2012-067419
[Patent Document 4] Japanese Unexamined Patent Application, First Publication No. 2003-113538

DISCLOSURE OF THE INVENTION

Problems to be Solved by the Invention

The first exhaust gas and the second exhaust gas are different from each other in the concentration of hydrogen cyanide etc., and the composition of the base gas (existence of oxygen). Therefore, when the first exhaust gas and the second exhaust gas are decomposed in one treatment furnace, there is a problem that hydrogen cyanide, ammonia, etc. cannot be sufficiently decomposed, a large amount of $NO_X$ is generated by the decomposition.

When the first exhaust gas and the second exhaust gas are decomposed in separate treatment furnaces, there is a problem that hydrogen cyanide, ammonia, and so on, can be sufficiently decomposed, but an amount of fuel used for combustion increases. In addition, since two treatment facilities are required, there is a problem that the equipment cost and the maintenance cost increase.

In consideration of the above-described problems, an object of the present invention is to provide an exhaust gas treatment method which prevents the generation of $NO_X$, and treats the first exhaust gas and the second exhaust gas with a small amount of fuel, and an exhaust gas treatment device which can treat the first exhaust gas and the second exhaust gas with a small amount of fuel.

Means for Solving the Problem

In order to solve the above problems, the present invention provides the following exhaust gas treatment methods and exhaust gas treatment devices.
(1) An exhaust gas treatment method including a first combustion step of treating a first exhaust gas discharged from a carbonization furnace for carbonizing a fibrous substance in an inert atmosphere and a graphitization furnace for graphitizing a fibrous substance in an inert atmosphere and a second combustion step of freaking a second exhaust gas discharged from a flameproofing furnace for flameproofing a fibrous substance in air atmosphere, wherein the first exhaust gas is combusted at an oxygen ratio of 0.8 or less in the first combustion step, and the second exhaust gas is combusted in the second combustion step using sensible heat and latent heat of a third exhaust gas discharged in the first combustion step.
(2) The exhaust gas treatment method according to (1), wherein the first exhaust gas is combusted at 1,000 to 1,600° C. in the first combustion step, and the second exhaust gas is combusted at 700 to 1,200° C. in the second combustion step.

(3) An exhaust gas treatment device including a first combustion furnace which treats a first exhaust gas, a second combustion furnace which treats a second exhaust gas, a first exhaust gas supplying device which supplies the first exhaust gas into the first combustion furnace, a second exhaust gas supplying device which supplies the second exhaust gas into the second combustion furnace, and a first burner which is provided in the first combustion furnace, the second combustion furnace is provided on the secondary side of the first combustion furnace, and an internal space of the first combustion furnace and an internal space of the second combustion furnace communicate with each other.
(4) The exhaust gas treatment device according to (3), wherein the first combustion furnace and the second combustion furnace each have an aperture, and the apertures are joined while being opposed to each other.
(5) The exhaust gas treatment device according to (4), wherein at least one of the first combustion furnace and the second combustion furnace has a throttle portion which regulates an aperture area of the aperture.
(6) The exhaust gas treatment device according to (3), wherein the exhaust gas treatment device further includes a communication pipe which is provided between the first combustion furnace and the second combustion furnace and allows the internal space of the first combustion furnace and the internal space of the second combustion furnace to communicate with each other.
(7) The exhaust gas treatment device according to any one of (3) to (6), wherein the exhaust gas treatment device further includes a second burner which is provided in the second combustion furnace.
(8) The exhaust gas treatment device according to any one of (3) to (6), wherein the exhaust gas treatment device further includes a first thermometer which measures a temperature in the first combustion furnace, a second thermometer which measures a temperature in the second combustion furnace, and a control unit for controlling an amount of combustion of the first burner, and the amount of combustion of the first burner is controlled based on the temperatures obtained from the first thermometer and the second thermometer.
(9) The exhaust gas treatment device according to (7), wherein the exhaust gas treatment device further includes a first thermometer which measures a temperature in the first combustion furnace, a second thermometer which measures a temperature in the second combustion furnace, and a control unit for controlling an amount of combustion of the first burner and the second burner, and the amount of combustion of the first burner and the second burner is controlled based on the temperatures obtained from the first thermometer and the second thermometer.
(10) The exhaust gas treatment device according to V of (3) to (9), wherein oxygen-enriched air having an oxygen concentration of 25 to 100% by volume is used as a combustion-supporting gas of the first burner provided in the first combustion furnace.
(11) The exhaust gas treatment device according to any one of (3) to (10), wherein the first exhaust gas supplying device is the first burner and the first exhaust gas is supplied from the first burner.
(12) The exhaust gas treatment device according to any one of (3) to (10), wherein the first exhaust gas supplying device is a first blowing port provided in a wall of the first combustion furnace, and the first exhaust gas is supplied from the first blowing port.
(13) The exhaust gas treatment device according to any one of (3) to (12) wherein the second exhaust gas supplying device is a second blowing port provided in a wall of the second combustion furnace, and the second blowing port is configured so as to blow the second exhaust gas in a tangential direction of the wall of the second combustion furnace.
(14) The exhaust gas treatment device according to any one of (3) to (13), wherein the exhaust gas treatment device further includes a heat exchanger at a stage subsequent to the exhaust gas treatment device, and the second exhaust gas is preheated using sensible heat of an exhaust gas discharged from the second combustion furnace.

Effects of Present Invention

In the exhaust gas treatment method of the present invention, since the first exhaust gas is combusted at a low oxygen ratio of oxygen ratio of 0.8 or less, the first exhaust gas can be treated while suppressing generation of $NO_X$.

In addition, since the exhaust gas treatment method includes the first combustion step of treating the first exhaust gas and the second combustion step of treating the second exhaust gas, and the second exhaust gas is combusted using sensible heat and latent heat of the exhaust gas discharged from the first combustion step, the amount of fuel used can be reduced. Furthermore, since the first exhaust gas and the second exhaust gas can be continuously treated, the equipment cost and the maintenance cost can be reduced.

Next, since the exhaust gas treatment device of the present invention includes the first combustion furnace for treating the first exhaust gas, the second combustion furnace for treating the second exhaust gas, the first burner provided in the first combustion furnace, the second combustion furnace is provided on the secondary side of the first combustion furnace, and the internal space of the first combustion furnace and the internal space of the second combustion furnace communicate with each other, the first exhaust gas after combustion in the first combustion furnace can be supplied into the second combustion furnace. Thus, the second exhaust gas can be treated by utilizing sensible heat and latent heat of the first exhaust gas after combustion in the second combustion furnace. As a result, the amount of fuel used can be reduced. Further, since the first exhaust gas and the second exhaust gas can be treated by a single apparatus, the equipment cost and the maintenance cost can be reduced.

BRIEF DESCRIPTION OF THE DRAWINGS

FIG. 1 is a cross-sectional view showing a first embodiment of the exhaust gas treatment device according to the present invention.

FIG. 2 is a cross-sectional view showing a second embodiment of the exhaust gas treatment device according to the present invention.

FIG. 2 is a cross-sectional view showing a third embodiment of the exhaust gas treatment device according to the present invention.

EMBODIMENTS OF THE INVENTION

Figure 3:
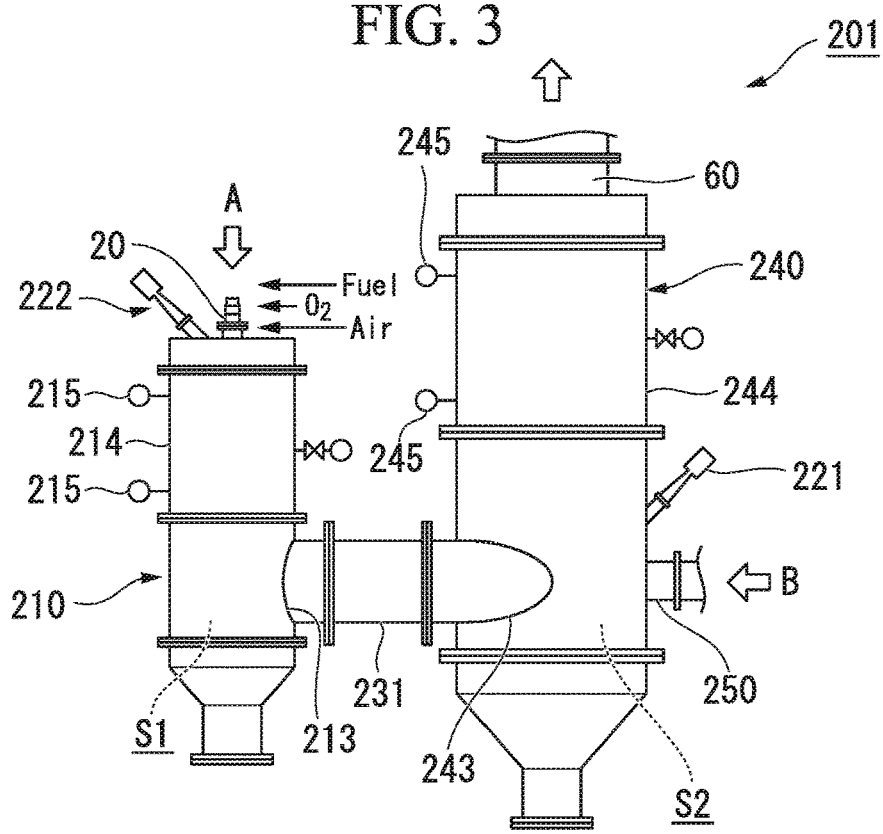

Below, embodiments of the exhaust gas treatment method will be explained in detail using figures together with the exhaust gas treatment device. Moreover, in order to easily understand characteristics, the characteristics may be enlarged as a matter of convenience, size ratio of each components may not be the same as that of an actual component in figures used in the following explanations.

<First Embodiment>

(Exhaust Gas Treatment Device)

First embodiment of the exhaust gas treatment device 1 according to the present invention is explained. FIG. 1 is a cross-sectional view showing the first embodiment of the exhaust gas treatment device 1 according to the present invention.

As shown in FIG. 1, the exhaust gas treatment device 1 includes a first combustion furnace 10, a first burner 20, a throttle portion 30, a second combustion furnace 40, a blowing port (second blowing port) 50, and an exhaust port 60.

By using the exhaust gas treatment device 1 according to this embodiment, an exhaust gas treatment method which is explained below can be carried out. Specifically, a first exhaust gas A which is discharged from the carbonizing furnace and the graphitizing furnace is treated in the first combustion furnace 10, and a second exhaust gas B which is discharged from the flameproofing furnace is treated in the second combustion furnace 40.

The first combustion furnace 10 is a tubular (for example, cylindrical) furnace which decomposes harmful gasses such as hydrogen cyanide, and ammonia, contained in the first exhaust gas A by combusting the first exhaust gas A. The first combustion furnace 10 includes an end wall 12 for mounting the first burner 20 and a side wall 14 provided around the end wall 12. The first combustion furnace 10 includes a first internal space 51 therein. Material for the first combustion furnace 10 is not particularly limited, but examples of the material include an alumina refractory material, and an alumina-silica refractory material.

The first combustion furnace 10 includes the first burner 20, a first thermometer (not shown in figures), and the throttle portion 30.

The first burner 20 is mounted on the end wall 12 so as to penetrate the center portion of the end wall 12. The first burner 20 is arranged coaxially to the first combustion furnace 10. Thereby, the first burner 20 produces flame in the first internal space S1, and combusts the first exhaust gas A in the first internal space S1 by the flame produced. To the first burner 20, fuel and combustion-supporting gas are supplied. A combustion amount and an oxygen ratio which are explained below can be controlled by adjusting the flow rate of the fuel and the combustion-supporting gas. Flame in the reducing atmosphere can be produced by adjusting the oxygen ratio.

Material for the fuel is not particularly limited, but preferable examples of the fuel include gas fuel, such as city gas, and LPG, and liquid fuel, such as kerosene, and A heavy oil.

Material for the combustion-supporting gas is not particularly limited as long as it contains oxygen, but preferable examples of the combustion-supporting gas include gas of which the oxygen concentration is in a range of 20.8 (air) to 100% by volume (pure oxygen). In addition, from the viewpoint of improvement of decomposition rate, gas of which the oxygen concentration is in a range of 20 to 100% by volume is especially preferable. The temperature in the combustion furnace can be increased by using gas of which the oxygen concentration is high, and the decomposition rate can be increased. As a result, since the residence time of the discharged gas in the first internal space S1 is shortened, the size of the first combustion furnace 10 can be reduced.

The exhaust gas treatment device 1 (or the first burner 20) is provided with a control unit (not shown in figures) which controls the combustion amount (explained below) of the first burner 20 based on the temperature in the first combustion furnace 10 and the temperature of second combustion furnace 40.

The first burner 20 is provided with a supplying line (not shown in figures) of the first exhaust gas A. To the end portion of the first burner 20 which opens toward the first internal space S1 in the first combustion furnace 10, a supplying port (not shown in figures) of the first exhaust gas A is provided. Thereby, the first burner 20 produces flame in an inert atmosphere in the first internal space S1, and supplies the first exhaust gas A into the first internal space S1.

The throttle portion 30 is provided with the side wall 14 on an aperture 13 side. The aperture area of the aperture 13 can be limited by the throttle portion 30. It is possible to prevent gas (containing oxygen) in the second internal space S2 which is explained below from entering into the first internal space S1 by limiting the aperture area. As a result, the inside of the first internal space S1 can be maintained in a reducing atmosphere.

The second combustion furnace 40 is provided at a secondary side of the first combustion furnace 10. The second combustion furnace 40 is a tubular (for example, cylindrical) furnace which decomposes harmful gasses such as hydrogen cyanide, and ammonia, contained in the second exhaust gas B by combusting the second exhaust gas B. The second combustion furnace 40 includes an end wall 42 for mounting the exhaust port 60 and a side wall 44 provided around the end wall 42. The second combustion furnace 40 includes a second internal space S2 therein. Material for the second combustion furnace 40 is not particularly limited, but examples of the material include alumina refractory material, and alumina-silica refractory material.

In the exhaust gas treatment device 1 of this embodiment, the aperture 13 of the first combustion furnace 10 and the aperture 43 of the second combustion furnace 40 are disposed opposite with each other, and the first internal space S1 is communicated with the second internal space S2. Thereby, a third gas which is produced by combusting the first exhaust gas A is supplied from the first internal space S1 to the second internal space S2 (below, exhaust gas which is obtained by combusting the first exhaust gas A in the first combustion furnace 10 is abbreviated as a third exhaust gas).

In the second combustion furnace 40, the second exhaust gas B is combusted using sensible heat and latent heat of the third exhaust gas. The harmful gas contained in the second exhaust gas B, such as hydrogen cyanide, is combusted and decomposed by combusting the second exhaust gas B.

A blowing port (second blowing port) 50 and an exhaust port 60 are provided in the second combustion furnace 40.

The blowing port (second blowing port) 50 is provided with the side wall 44 of the second combustion furnace 40 on the side of the aperture 43. The second exhaust gas B is supplied into the second internal space S2 from the blowing port 50. The blowing port 50 is provided so that the second exhaust gas B can be blown in the tangential direction of the side wall 44. As a result, it is possible to form a swirling flow by the third exhaust gas and the second exhaust gas B in the second internal space S2, so that the harmful gas contained in the second exhaust gas B is efficiently combusted and decomposed.

The exhaust port 60 is provided so as to penetrate the end wall 42 of the second combustion furnace 40. It is possible to discharge the gas combusted in the second internal space S2 from the exhaust port 60 to the outside.

(Exhaust Gas Treatment Method)

Below, the exhaust gas treatment method using the exhaust gas treatment device 1 will be explained.

The exhaust gas treatment method of this embodiment is an exhaust gas treatment method in which the first exhaust gas A is treated in a first combustion step, and the second exhaust gas B is treated in a second combustion step.

The first combustion step is a combustion step in which the first exhaust gas A is combusted at a low oxygen ratio, an oxygen ratio of 0.8 or less. Specifically, in the first combustion step, first, the gas (first exhaust gas A) discharged in the carbonization step and graphitization step is supplied from the first burner 20 into the first internal space S1. Next, the supplied first exhaust gas A is combusted in the temperature range of 1,000 to 1,600° C., by the first burner 20. The temperature in the first combustion furnace 10 is measured by the first thermometer (not shown in figures), and the temperature in the second combustion furnace 40 is measured by a second thermometer (not shown in figures). Based on the measured temperatures, the combustion temperature is controlled by adjusting the combustion amount of the first burner 20 by a control unit (not shown in figures). Fuel gas and combustion-supporting gas are supplied to the first burner 20, and the combustion amount is controlled by adjusting the supplying amount of the fuel gas and the combustion-supporting gas.

Moreover, "combustion amount" is the amount of heat generated per unit time caused by combusting fuel. As the combustion amount increases, the heat amount generated per unit time increases, so that the temperature of the first internal space S1 increases.

Since the first exhaust gas A to be treated in the first combustion furnace 10 is a nitrogen-based exhaust gas containing hydrogen cyanide, ammonia, and the like at a high concentration, when the combustion treatment is carried out under conditions in which the oxygen ration is higher than around the stoichiometric ratio (oxygen ratio is higher than 0.8), a large amount of $NO_x$ is produced. Therefore, in the first combustion furnace 10, treatment is carried out while forming a reducing atmosphere under a combustion conditions with an oxygen ratio of 0.8 or less.

This makes it possible to carry out combustion decomposition while suppressing the generation of $NO_x$. Therefore, in the exhaust gas treatment method of this embodiment, the oxygen ratio is controlled by adjusting the ratio of oxygen contained in the combustion-supporting gas to the fuel gas.

Moreover, the "oxygen ratio" "ratio of oxygen" is a value obtained by dividing the oxygen amount supplied to the burner by the theoretical oxygen amount required for combusting the fuel supplied to the burner. Therefore, theoretically, it can be said that the state where the oxygen ratio is 1.0 is a state in which complete combustion can be carried out using excessive or insufficient oxygen.

By combusting the first exhaust gas A, harmful gas such as hydrogen cyanide, ammonia and the like contained in the first exhaust gas A is combusted and decomposed. The third exhaust gas generated by combustion is supplied to the second combustion furnace 40 via the aperture 13.

The second combustion step is a combustion step in which the second exhaust gas B is combusted using the sensible heat and latent heat of the exhaust gas discharged in the first combustion step in the second combustion furnace 40.

Incidentally, the second exhaust gas B is an air-based exhaust gas containing hydrogen cyanide and ammonia, and has a much larger discharge amount than the first exhaust gas A. Therefore, when the oxygen ratio is reduced to 0.8 or less and the combustion decomposition is attempted in the same way as the first exhaust gas A, it is necessary to use a large amount of fuel, which is not realistic. In addition, hydrogen cyanide and ammonia can be decomposed while suppressing generation of $NO_x$ by performing combustion treatment at a low temperature even in an atmosphere in which oxygen exists.

Therefore, in the exhaust gas treatment method of the present embodiment, hydrogen cyanide and ammonia are decomposed while suppressing generation of $NO_x$ by combusting the second exhaust gas B in the temperature range of 700 to 1,200° C.

Specifically, firstly, the third exhaust gas supplied from the first combustion furnace 10 is mixed with the second exhaust gas B supplied from the blowing port 50 provided in the second combustion furnace 40. By mixing the second exhaust gas B and the third exhaust gas in the second internal space S2, the gas such as CO or $H_2$ contained in the third exhaust gas and the oxygen contained in the second exhaust gas B are combusted, and the temperature inside the second combustion furnace 40 can be raised to 700° C. or higher by the heat generated by the combustion. When the temperature in the second combustion furnace 40 reaches 700° C. or higher, harmful gas such as hydrogen cyanide contained in the second exhaust gas B is combusted and decomposed. Thus, in the second combustion step, sensible heat and latent heat (combustion heat quantity of exhaust gas) of the third exhaust gas discharged in the first combustion step are effectively utilized.

The temperature inside the second combustion furnace 40 is measured by the second thermometer (not shown in figures). By controlling the oxygen ratio of the first burner 20 by the control unit (not shown in figures) based on the measured temperature, the amount of uncombusted gas flowing into the second combustion furnace 40 is controlled. Thus, the temperature in the second combustion furnace 40 can be controlled.

Next, the exhaust gas generated by combustion in the second internal space S2 is exhausted to the outside from the exhaust port 60, thereby completing the exhaust gas treatment method of the present embodiment.

As described above, the exhaust gas treatment device 1 of the present embodiment includes the first combustion furnace 10 for treating the first exhaust gas A, the first burner 20 provided in the first combustion furnace 10, and the second combustion furnace 40 for treating the second exhaust gas B, the second combustion furnace 40 is provided on the secondary side of the first combustion furnace 10 and the first internal space S1 of the first combustion furnace 10 and the second internal space S2 of the second combustion furnace 40 communicate with each other so that the third exhaust gas after combusting in the first combustion furnace 10 is supplied into the second combustion furnace 40. Thereby, in the second combustion furnace 40, the second exhaust gas B can be treated using the sensible heat and the latent heat of the third exhaust gas. As a result, the amount of fuel required for treating the first exhaust gas A and the second exhaust gas B can be educed. Furthermore, since the first exhaust gas A and the second exhaust gas B can be treated by a single apparatus, the equipment cost and the maintenance cost can be reduced.

In addition, since the exhaust gas treatment device 1 of the present embodiment includes the throttle portion 30 for regulating the aperture area between the first internal space S1 and the second internal space S2, it is possible to prevent the gas (including oxygen) in the second internal space S2 from entering into the first internal space S1, and maintain the inside of the first internal space S1 in the reducing atmosphere.

Next, according to the exhaust gas treatment method of this embodiment, since the first exhaust gas A is combusted at a low oxygen ratio having an oxygen ratio of 0.8 or less, the first exhaust gas A can be treated while suppressing generation of $NO_X$.

Further, the exhaust gas treatment method of this embodiment includes the first combustion step of treating the first exhaust gas A and the second combustion step of treating the second exhaust gas B, wherein the second exhaust gas B is combusted using the sensible heat and the latent heat of the exhaust gas discharged in the first combustion step. Therefore, it is possible to reduce the amount of fuel used by the burner. Furthermore, since the exhaust gas discharged from the carbonization furnace and the graphitization furnace and the exhaust gas discharged from the flameproofing furnace can be treated in successive steps, the equipment cost and the maintenance cost can be reduced.

<Second Embodiment>

Next, an exhaust gas treatment device of a second embodiment according to the present invention will be described. FIG. 2 is a cross-sectional view of an exhaust gas treatment device of a second embodiment according to the present invention.

As shown in FIG. 2, the exhaust gas treatment device 101 of this embodiment includes the first combustion furnace 10, the first burner 20, the throttle section 30, the second combustion furnace 40, the blowing port (second blowing port) 50, the exhaust port 60, and a blowing port (first blowing port) 151. That is, the exhaust gas treatment device 101 according to this embodiment is different from the exhaust gas treatment device 1 described above in that the exhaust gas treatment device 101 is provided with the blowing port 151. Therefore, the same components as those of the exhaust gas treatment device 1 are denoted by the same reference numerals, and a description thereof will be omitted.

The blowing port (first blowing port) 151 is provided on the side wall 14 at a side of the end wall 12 of the first combustion furnace 10. The first exhaust gas A is supplied to the first internal space S1 by the blowing port 151. The blowing port 151 is provided so that the first exhaust gas A can be blown in the tangential direction of the side wall 14. As a result, a swirling flow by the first exhaust gas A can be formed in the first internal space S1, so that harmful gas contained in the first exhaust gas A can be efficiently combusted and decomposed.

According to the exhaust gas treatment device 101 of this embodiment, the exhaust gas treatment device 101 includes the blowing port 151, and the first exhaust gas A can he supplied from the side wall 14 of the first combustion furnace 10. As a result, since the first exhaust gas A does not directly enter the vicinity of the flame in which oxygen exists, generation of $NO_X$ can be further suppressed.

<Third Embodiment>

Next, FIG. 3 is a diagram showing an exhaust gas treatment device of a third embodiment according to the present invention.

As shown in FIG. 3, the exhaust gas treatment device 201 of this embodiment includes a first combustion furnace 210, the first burner 20, a second combustion furnace 240, a blowing port (second blowing port) 250, the exhaust port 60, a second burner 221, and a connecting pipe 231. The exhaust gas treatment device 201 of this embodiment includes the second burner 221 and the connection pipe 231 between the first combustion furnace 210 and the second combustion furnace 240 and differs from the exhaust gas treatment device 1 described above in that the combustion furnace 210 and the second combustion furnace 240 are constituted by separate furnace bodies. Therefore, the same components as those of the exhaust gas treatment device 1 are denoted by the same reference numerals, and a description thereof will be omitted.

The first combustion furnace 210 is a furnace which combusts and decomposes harmful gas such as hydrogen cyanide and ammonia contained in the first exhaust gas A by combusting the first exhaust gas A. The shape of the first combustion furnace 210 is a tubular shape (for example, a cylindrical shape) in which one end is closed. The first combustion furnace 210 has a first internal space S1 therein. In addition, the first combustion furnace 210 has an aperture 213 on the lower bottom side of the side wall 214. The material of the first combustion furnace 210 is not particularly limited, but specifically, for example, alumina refractories, alumina-silicate refractories, and the like can be used.

The first thermometer 215 is provided in the side wall 214. The temperature in the first combustion furnace 210 carp be measured by the first thermometer 215. Based on the temperature in the first combustion furnace 210, the amount of combustion of the first burner 20 can be controlled by a control unit (not shown in figures).

The connecting pipe 231 is a pipe provided for communicating the first internal space S1 in the first combustion furnace 210 with the second internal space S2 in the second combustion furnace 240 to be described later. Specifically, the connecting pipe 231 is provided so as to connect the aperture 213 of the first combustion furnace 210 and the aperture 243 of the second combustion furnace 240 described later. The material of the connecting pipe 231 is not particularly limited, but specifically, for example, alumina refractory, alumina-silicate refractory, or the like can be used.

By regulating the inner diameter of the connecting pipe 231, and the aperture area of the aperture 213 and the aperture 243, it is possible to prevent the gas (containing oxygen) in the second internal space S2 from entering into the first internal space S1. As a result, it is possible to maintain the inside of the first internal space S1 in the reducing atmosphere.

The second combustion furnace 240 is a furnace which decomposes harmful gas such as hydrogen cyanide and ammonia contained in the second exhaust gas B by combusting the second exhaust gas B. The second combustion furnace 240 is provided on the secondary side of the first combustion furnace 210 via a connection pipe 231. The shape of the second combustion furnace 240 is a tubular shape (for example, a cylindrical shape) in which one end is closed. The second combustion furnace 240 has a second internal space S2 therein. In addition, the second combustion furnace 240 has an aperture 243 on the lower bottom side of the side wall 244. The material of the second combustion furnace 240 is not particularly limited, but specifically, for example, alumina refractories, alumina-silicate refractories, and the like can be used.

The second burner 221 is provided with the side wait 244 of the second combustion furnace 240 on the side of the blowing port 250. By the second burner 221, combustion of the second exhaust gas B and the third exhaust gas can be stably performed. The second burner 221 is supplied with fuel and a combustion-supporting gas, and it is possible to control the combustion amount and the oxygen ratio described later by adjusting the flow rates of the fuel and the combustion-supporting gas. As the fuel and the combustion-supporting gas, the same as those of the first burner 20 can be used. The second burner 221 does not need to be constantly combusted and it may ignite when the temperature in the second combustion furnace 240 becomes lower than the predetermined temperature.

The blowing port (second blowing port) 250 is provided with the second combustion furnace 240 on the opposite side of the aperture 243. The second exhaust gas B can be supplied into the second internal space S 2 from the blowing port 250. The blowing port 250 can be provided so that the second exhaust gas B can be blown in the tangential direction of the side wall 244. As a result, it is possible to form a swirling flow by the second exhaust gas B in the second internal space S2, so that mixing with the third exhaust gas is promoted and the harmful gas contained in the second exhaust gas B can be efficiently combusted and decomposed.

The second thermometer 245 is provided on the side wall 244. The second thermometer 245 can measure the temperature in the second combustion furnace 240. Based on the temperature in the second combustion furnace 240, the combustion amount and the oxygen ratio of the second burner 221 can be controlled by a control unit (not shown in figures).

According to the exhaust gas treatment device 201 of this embodiment, since the second burner 221 is provided, combustion of the second exhaust gas B and the third exhaust gas can be stably performed.

Further, according to the exhaust gas treatment device 201 of this embodiment, since the connection pipe 231 is provided between the first combustion furnace 210 and the second combustion furnace 240, and the first combustion furnace 210 and the second combustion furnace 240 is composed of separate furnace bodies, the length of the furnace can be adjusted, and when installed vertically, the height can be lowered and the degree of freedom of installation can be widened.

The technical scope of the present invention is not limited to the above embodiments, and various modifications can be made without departing from the spirit of the present invention. For example, in the exhaust gas treatment device 1, 101, and 201 of the above-described embodiments, the exhaust gas combusted in the second combustion furnace 40 is discharged to the outside via the exhaust port 60, but the second exhaust gas B may be preheated by connecting a heat-exchanger with the exhaust port 60 and using the sensible heat of the exhaust gas discharged from the exhaust port 60. Thereby, the amount of fuel used can be reduced.

Further, in the exhaust gas treatment device 1, 101, and 201 according to the above-described embodiments, two combustion furnaces are joined. However, it is possible to divide a space in one combustion furnace into two internal spaces. In this case, when the throttle portion 30 is provided inside the combustion furnace, the space on the primary side of the throttle portion 30 is set as the first combustion furnace and the space on the secondary side is set as the second combustion furnace. In the case where the throttle portion 30 is not provided inside the combustion furnace, the space on the primary side of the blowing port (second blowing port) 50 is defined as the first combustion furnace, the space on the secondary side is defined as the second combustion.

In the exhaust gas treatment device 1 and 101 of the above-described embodiments, the throttle portion 30 is provided on the side of the aperture 13 of the first combustion furnace 10, but the throttle portion 30 may be provided in the second combustion furnace 40 on the side of the aperture 43 of the side wall 44.

In the exhaust gas treatment device 1 and 101 according to the above-described embodiments, a second burner is not provided in the second combustion furnace 40. However, the exhaust gas treatment device 1 and 101 of the above-described embodiments includes a second burner which is provided with the side wall 44 so as to penetrate. By the second burner, combustion of the second exhaust gas B and the third exhaust gas can be stably performed.

EXAMPLE 1

(Comparison with Direct-Combustion Method)

Using the exhaust gas treatment device 1 shown in FIG. 1 and the conventional direct-combustion type exhaust gas treatment device of the prior art, treatment tests were carried out using simulated gas of the first exhaust gas discharged from the carbonization furnace and the graphitization furnace, and the second exhaust gas discharged from the flameproofing furnace.

Table 1 shows the composition and flow rate of the simulated gas of the first exhaust gas and the second exhaust gas. For simulated gas, NO was used as an alternative to HCN (the validity of using NO as a simulated gas will be described later). In this treatment test, simulated gas was treated under three conditions (Conditions 1-1, 1-2, and 1-3).

Table 2 shows the combustion conditions of the burner of the exhaust gas treatment device 1 and the direct-combustion type exhaust gas treatment device.

In this example, pure oxygen having an oxygen concentration of 100% was used as the combustion-supporting gas and combusted at an oxygen ratio of 0.7 in the first burner 20. The temperature of the first combustion furnace 10 was 1,600° C. and the temperature of the second combustion furnace 40 was 1000° C.

In the direct-combusting type treatment device, treatment was carried out at 1,000° C.

TABLE 1

| | | Condition 1-1 | Condition 1-2 | Condition 1-3 |
|---|---|---|---|---|
| First exhaust gas | NO concentration [vol %] | 5 | 2.5 | 1 |
| | NH$_3$ concentration [vol %] | 5 | 2.5 | 1 |
| | Base gas | Nitrogen | Nitrogen | Nitrogen |
| | Flow rate [Nm$^3$/h] | 1 | 1 | 1 |
| Second exhaust gas | NO concentration [vol %] | 0 | 0 | |
| | NH$_3$ concentration [vol %] | 0.01 | 0.01 | 0.01 |
| | Base gas | Air | Air | Air |
| | Flow rate [Nm$^3$/h] | 10 | 10 | 10 |

TABLE 2

|  | Exhaust gas treatment device 1 | Direct-combustion type exhaust gas treatment device |
|---|---|---|
| Flow rate of city gas [Nm³/h] | 1.3 | 3 |
| Flow rate of oxygen [Nm³/h] | 2.1 | — |
| Flow rate of air [Nm³/h] | — | 33 |
| Oxygen concentration of combustion-supporting gas [vol %] | 100 | 20.8 |

Table 3 shows the test results. From these results, it was confirmed that ammonia ($NH_3$) is decomposed to an extremely low concentration, and the generation of $NO_X$ is suppressed to about 90 ppm in the exhaust gas treatment device 1 even under the condition 1-1 in which NO and $NH_3$ are added at the highest concentration. On the other hand, it was confirmed that when NO and $NH_3$ are decomposed, the $NO_X$ concentration increases in the direct-combustion type exhaust gas treatment system.

Further, it was also confirmed that the first exhaust gas and the second exhaust gas are treated with fewer fuel in the exhaust gas treatment device 1 of the present embodiment than the direct-combustion type exhaust gas treatment device.

TABLE 3

|  | Condition 1-1 | | Condition 1-2 | | Condition 1-3 | |
|---|---|---|---|---|---|---|
|  | Exhaust gas treatment device 1 | Direct-combustion type exhaust gas treatment device | Exhaust gas treatment device 1 | Direct-combustion type exhaust gas treatment device | Exhaust gas treatment device 1 | Direct-combustion type exhaust gas treatment device |
| $NH_3$ concentration [ppm] | 0 | 5 | 0 | 3 | 0 | 0 |
| NOx concentration [ppm] | 90 | 1210 | 73 | 730 | 55 | 350 |

EXAMPLE 2

(Effect of Oxygen Ratio)

Using the same exhaust gas treatment device 1 in Example 1, the concentration of $NH_3$ and $NO_X$ contained in the exhaust gas after treating the simulated gas of the first exhaust gas and the second exhaust gas under the condition 1-2 of Table 3 were measured by changing the oxygen ratio of the first burner 20 as shown in Table 4.

TABLE 4

|  | Condition 2-1 | Condition 2-2 | Condition 2-3 | Condition 2-4 | Condition 2-5 | Condition 2-6 |
|---|---|---|---|---|---|---|
| Flow rate of city gas [Nm³/h] | 1.3 | 1.3 | 1.3 | 1.3 | 1.3 | 1.3 |
| Flow rate of oxygen [Nm³/h] | 1.8 | 2.1 | 2.4 | 2.7 | 3.0 | 3.3 |
| Oxygen ratio [—] | 0.6 | 0.7 | 0.8 | 0.9 | 1.0 | 1.1 |
| Oxygen concentration of combustion-supporting gas [vol %] | 30 | 30 | 30 | 30 | 30 | 30 |

Figure 4:
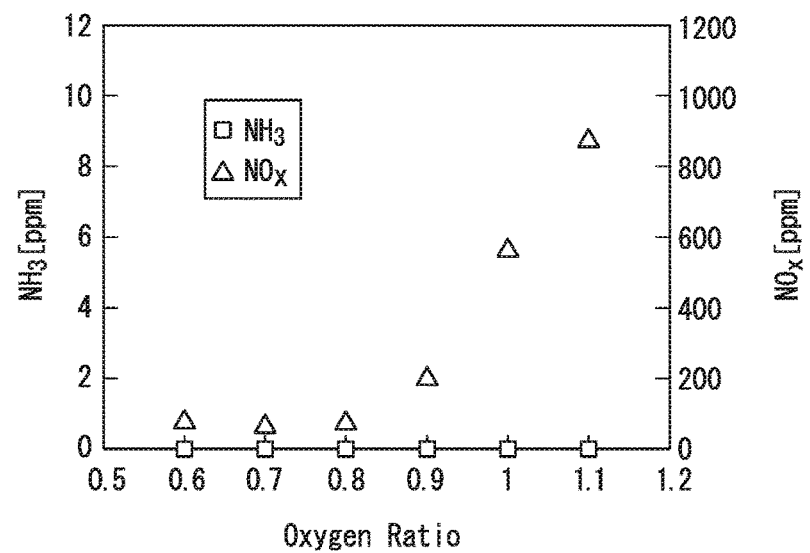
FIG. 4 is a graph showing the relationship between a concentration of $NH_3$ and $NO_X$ and a ratio of oxygen which are discharged from the exhaust gas treatment device.

FIG. 4 shows the relationship between the concentration of $NH_3$ and $NO_X$ in the exhaust gas after treating discharged from the exhaust port 60 of the exhaust gas device 1 and the oxygen ratio.

From these results, it was confirmed that $NH_3$ was less than 0.1 ppm under all conditions, and almost all could be decomposed.

Further, when the oxygen ratio of the first burner 20 is set to be larger than 0.8, the $NO_X$ tends to rapidly increase. It was confirmed that the first exhaust gas is treated while suppressing the generation of $NO_X$ by setting the oxygen ratio to 0.8 or less.

EXAMPLE 3

(Test on Pilot Facility)

Using the exhaust gas treatment device 201 shown in FIG. 3 as a pilot facility, exhaust gas treatment was performed.

Table 5 shows the composition and flow rate of the simulated gas of the first exhaust gas and the second exhaust gas. The flow rate of the second exhaust gas was adjusted to 300, 600, and 900 Nm³/h (conditions 3-1, 3-2, and 3-3). Table 6 also shows the burner combustion conditions under each exhaust gas condition.

TABLE 5

|  |  | Condition 3-1 | Condition 3-2 | Condition 3-3 |
|---|---|---|---|---|
| First exhaust gas | NO concentration [vol %] | 5 | 5 | 5 |
|  | $NH_3$ concentration [vol %] | 5 | 5 | 5 |
|  | Base gas | Nitrogen | Nitrogen | Nitrogen |
|  | Flow rate [Nm³/h] | 30 | 30 | 30 |

TABLE 5-continued

|  |  | Condition 3-1 | Condition 3-2 | Condition 3-3 |
|---|---|---|---|---|
| Second exhaust gas | NO concentration [vol %] | 0 | 0 | 0 |
|  | $NH_3$ concentration [vol %] | 0.01 | 0.01 | 0.01 |
|  | Base gas | Air | Air | Air |
|  | Flow rate [$Nm^3/h$] | 300 | 600 | 900 |

TABLE 6

| | Exhaust gas treatment device 201 | | |
|---|---|---|---|
| Exhaust gas condition | Condition 3-1 | Condition 3-2 | Condition 3-3 |
| Flow rate of city gas [$Nm^3/h$] | 15 | 23 | 31 |
| Flow rate of oxygen [$Nm^3/h$] | 10 | 15 | 20 |
| Flow rate of air [$Nm^3/h$] | 73 | 112 | 150 |
| Oxygen concentration of combustion-supporting gas [vol %] | 30 | 30 | 30 |

Table 7 shows the concentrations of $NH_3$ and $NO_X$ in the exhaust gas after treating discharged from the exhaust port 60 of the exhaust gas treatment device 201. From these results, it was confirmed that the exhaust gas treatment device 201 decomposes $NH_3$ to an extremely low concentration, and furthermore, it is possible to suppress generation of $NO_X$ accompanying combustion.

TABLE 7

| | Exhaust gas treatment device 201 | | |
|---|---|---|---|
| Combustion condition | Condition 3-1 | Condition 3-2 | Condition 3-3 |
| $NH_3$ concentration [ppm] | 0.8 | 0.6 | 0.5 |
| Nox concentration [ppm] | 55 | 38 | 25 |

EXAMPLE 4

(Validation of Using Simulated Gas)

NO was used as an alternative simulated gas for HCN. The validity of using NO as simulated gas was studied by reaction analysis in the simulation.

Reaction analysis was performed using CHEMKIN-PRO (Reaction Design, detailed chemical reaction analysis support software). The analysis conditions are shown in Table 8. Condition 4-1 is a case where HCN is added to the first combustion furnace 10 under a reducing atmosphere and condition 4-2 is a case where NO is added.

TABLE 8

| | | Condition 4-1 | Condition 4-2 |
|---|---|---|---|
| Fuel | $CH_4$ [mol] | 1.0 | 1.0 |
| Oxidizing agent | $O_2$ [mol] | 1.6 | 1.6 |
| Gas to be treated [mol] | HCN | 0.1 | — |
|  | NO | — | 0.1 |
|  | $N_2$ | 0.9 | 0.9 |
| Reaction temperature [° C.] | | 1500 | 1500 |

Figure 5:
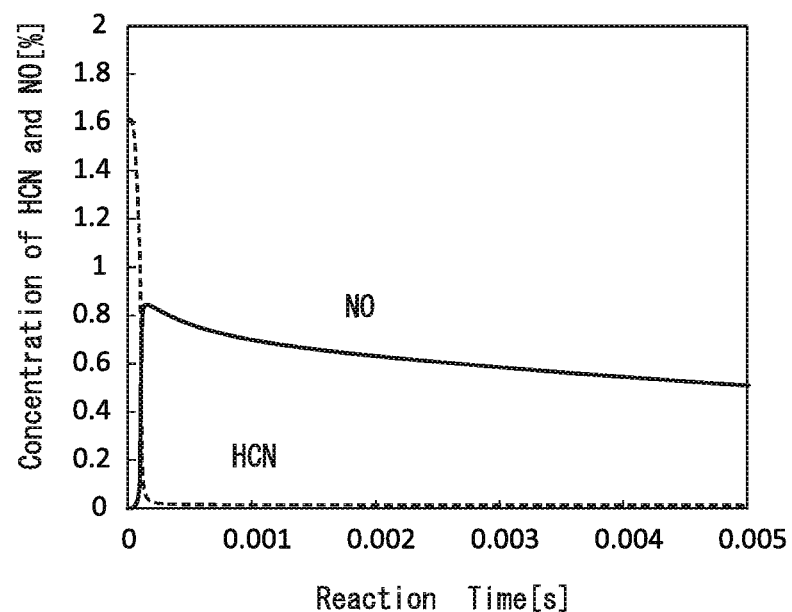
FIG. 5 is a graph showing decomposition behavior of HCN and formation and decomposition behavior of NO by reaction analysis.
Figure 6:
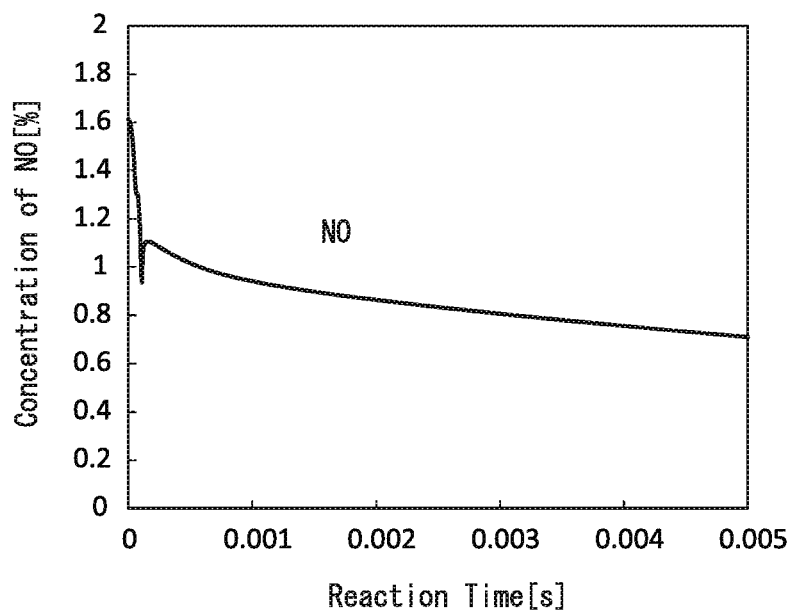
FIG. 6 is a graph showing decomposition behavior of NO by reaction analysis when NO is added.

FIG. 5 shows the decomposition behavior of HCN and the generation/decomposition behavior of NO by the reaction analysis under Condition 4-1. In addition, FIG. 6 shows the NO decomposition behavior by the reaction analysis when NO is added under Condition 4-2.

It is understood from FIG. 5 that HCN is rapidly decomposed in a reducing combustion atmosphere, and $NO_X$ is rapidly generated due to the decomposition of HCN, and then $NO_X$ generated is gradually decomposed. Comparing the change in NO concentration in FIGS. 5 and 6, the decomposition behavior shows the same trend, and it is possible to evaluate the decomposition behavior of NO generated along with decomposition of HCN by using NO as the simulation gas.

INDUSTRIAL APPLICABILITY

The exhaust gas treatment method and the exhaust gas treatment device of the present invention can be used as a device and a method for treating exhaust gas containing hydrogen cyanide, ammonia and the like.

DESCRIPTION OF REFERENCE NUMERALS 1, 101, 201 exhaust gas treatment device
10, 210 first combustion furnace
12 end wall
13, 213 aperture
14, 214 side wall
20 first burner
30 throttle portion
40, 240 second combustion furnace
42 end wall
43, 243 aperture
44, 244 side wall
50, 250 blowing port (second blowing port)
60 exhaust port
151 blowing port (first blowing port)
215 first thermometer
221 second burner
222 pilot burner
231 connection pipe
245 second thermometer
S1 first interval space
S2 second internal space
A first exhaust gas
B second exhaust gas

The invention claimed is:

1. An exhaust gas treatment device comprising:
a first combustion furnace which treats a first exhaust gas;
a second combustion furnace which treats a second exhaust gas;
a first exhaust gas supplying device which supplies the first exhaust gas into the first combustion furnace;
a second exhaust gas supplying device which supplies the second exhaust gas into the second combustion furnace; and
a first burner which is provided in the first combustion furnace,
wherein the second combustion furnace is provided on the secondary side of the first combustion furnace, and an internal space of the first combustion furnace and an internal space of the second combustion furnace communicate with each other, wherein the exhaust gas treatment device further comprises a first thermometer which measures a temperature in the first combustion furnace, a second thermometer which measures a temperature in the second combustion furnace, and a control unit which controls an amount of combustion of the first burner, and the amount of combustion of the first burner is controlled based on the temperatures obtained from the first thermometer and the second thermometer.

2. The exhaust gas treatment device according to claim 1, wherein oxygen-enriched air having an oxygen concentration of 25 to 100% by volume is used as a combustion-supporting gas of the first burner provided in the first combustion furnace.

3. The exhaust gas treatment device according to claim 1, wherein the first exhaust gas supplying device is the first burner and the first exhaust gas is supplied from the first burner.

4. The exhaust gas treatment device according to claim 1, wherein the first exhaust gas supplying device is a first blowing port provided in a wall of the first combustion furnace, and the first exhaust gas is supplied from the first blowing port.

5. The exhaust gas treatment device according to claim 1, wherein the second exhaust gas supplying device is a second blowing port provided in a wall of the second combustion furnace, and the second blowing port is configured so as to blow the second exhaust gas in a tangential direction of the wall of the second combustion furnace.

6. The exhaust gas treatment device according to claim 1, wherein the exhaust gas treatment device further comprises a heat exchanger at a stage subsequent to the exhaust gas treatment device, and the second exhaust gas is preheated using sensible heat of an exhaust gas discharged from the second combustion furnace.

7. The exhaust gas treatment device according to claim 1, wherein the first combustion furnace and the second combustion furnace each have an aperture, and the apertures are joined while being opposed to each other.

8. The exhaust gas treatment device according to 7, wherein at least one of the first combustion furnace and the second combustion furnace has a throttle portion which regulates an aperture area of the aperture.

9. The exhaust gas treatment device according to claim 1, wherein the exhaust gas treatment device further comprises a communication pipe which is provided between the first combustion furnace and the second combustion furnace and allows the internal space of the first combustion furnace and the internal space of the second combustion furnace to communicate with each other.

10. An exhaust gas treatment method using the exhaust gas treatment device according to claim 8 comprising:
a first combustion step of treating a first exhaust gas discharged from a carbonization furnace for carbonizing a fibrous substance in an inert atmosphere and a graphitization furnace for graphitizing a fibrous substance in an inert atmosphere; and
a second combustion step of treating a second exhaust gas discharged from a flameproofing furnace for flameproofing a fibrous substance in air atmosphere;
wherein the first exhaust gas is combusted at an oxygen ratio of 0.8 or less in the first combustion step, and
the second exhaust gas is combusted in the second combustion step using sensible heat and latent heat of a third exhaust gas discharged in the first combustion step.

11. The exhaust gas treatment method according to claim 10, wherein the first exhaust gas is combusted at 1,000 to 1,600° C. in the first combustion step, and the second exhaust gas is combusted at 700 to 1,200° C. in the second combustion step.

12. An exhaust gas treatment device comprising:
a first combustion furnace which treats a first exhaust gas;
a second combustion furnace which treats a second exhaust gas;
a first exhaust gas supplying device which supplies the first exhaust gas into the first combustion furnace;
a second exhaust gas supplying device which supplies the second exhaust gas into the second combustion furnace; and
a first burner which is provided in the first combustion furnace,
wherein the second combustion furnace is provided on the secondary side of the first combustion furnace, and an internal space of the first combustion furnace and an internal space of the second combustion furnace communicate with each other, wherein the exhaust gas treatment device further comprises a second burner which is provided in the second combustion furnace, and wherein the exhaust gas treatment device further comprises a first thermometer which measures a temperature in the first combustion furnace, a second thermometer which measures a temperature in the second combustion furnace, and a control unit which controls an amount of combustion of the first burner and the second burner, and the amount of combustion of the first burner and the second burner is controlled based on the temperatures obtained from the first thermometer and the second thermometer.

13. The exhaust gas treatment device according to claim 12, wherein oxygen-enriched air having an oxygen concentration of 25 to 100% by volume is used as a combustion-supporting gas of the first burner provided in the first combustion furnace.

14. The exhaust gas treatment device according to claim 12, wherein the first exhaust gas supplying device is the first burner and the first exhaust gas is supplied from the first burner.

15. The exhaust gas treatment device according to claim 12, wherein the first exhaust gas supplying device is a first blowing port provided in a wall of the first combustion furnace, and the first exhaust gas is supplied from the first blowing port.

16. The exhaust gas treatment device according to claim 12, wherein the second exhaust gas supplying device is a second blowing port provided in a wall of the second combustion furnace, and the second blowing port is configured so as to blow the second exhaust gas in a tangential direction of the wall of the second combustion furnace.

17. The exhaust gas treatment device according to claim 12, wherein the exhaust gas treatment device further comprises a heat exchanger at a stage subsequent to the exhaust gas treatment device, and the second exhaust gas is preheated using sensible heat of an exhaust gas discharged from the second combustion furnace.

18. The exhaust gas treatment device according to claim 12, wherein the first combustion furnace and the second combustion furnace each have an aperture, and the apertures are joined while being opposed to each other.

19. The exhaust gas treatment device according to claim 18, wherein at least one of the first combustion furnace and the second combustion furnace has a throttle portion which regulates an aperture area of the aperture.

20. The exhaust gas treatment device according to claim 12, wherein the exhaust gas treatment device further comprises a communication pipe which is provided between the first combustion furnace and the second combustion furnace and allows the internal space of the first combustion furnace and the internal space of the second combustion furnace to communicate with each other.

21. An exhaust gas treatment method using the exhaust gas treatment device according to claim 12 comprising:
   a first combustion step of treating a first exhaust gas discharged from a carbonization furnace for carbonizing a fibrous substance in an inert atmosphere and a graphitization furnace for graphitizing a fibrous substance in an inert atmosphere; and
   a second combustion step of treating a second exhaust gas discharged from a flameproofing furnace for flameproofing a fibrous substance in air atmosphere;
   wherein the first exhaust gas is combusted at an oxygen ratio of 0.8 or less in the first combustion step, and
   the second exhaust gas is combusted in the second combustion step using sensible heat and latent heat of a third exhaust gas discharged in the first combustion step.

22. The exhaust gas treatment method according to claim 21, wherein the first exhaust gas is combusted at 1,000 to 1,600° C. in the first combustion step, and the second exhaust gas is combusted at 700 to 1,200° C. in the second combustion step.

* * * * *